US012684473B2

(12) United States Patent
Yanai et al.

(10) Patent No.: US 12,684,473 B2
(45) Date of Patent: Jul. 14, 2026

(54) COMMUNICATION SYSTEM, COMMUNICATION DEVICE, AND COMMUNICATION METHOD

(71) Applicant: NEC Corporation, Tokyo (JP)

(72) Inventors: Masaru Yanai, Tokyo (JP); Hiroaki Aminaka, Tokyo (JP); Motoharu Ohtake, Tokyo (JP); Masaaki Ootake, Tokyo (JP); Kei Yanagisawa, Tokyo (JP); Kosei Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 291 days.

(21) Appl. No.: 18/281,876

(22) PCT Filed: Mar. 22, 2021

(86) PCT No.: PCT/JP2021/011730
§ 371 (c)(1),
(2) Date: Sep. 13, 2023

(87) PCT Pub. No.: WO2022/201248
PCT Pub. Date: Sep. 29, 2022

(65) Prior Publication Data
US 2024/0163781 A1     May 16, 2024

(51) Int. Cl.
H04W 48/18     (2009.01)
H04W 64/00     (2009.01)
H04W 88/06     (2009.01)

(52) U.S. Cl.
CPC ......... H04W 48/18 (2013.01); H04W 64/006 (2013.01); *H04W 88/06* (2013.01)

(58) Field of Classification Search
CPC ... H04W 48/18; H04W 64/006; H04W 88/06; H04W 84/18; H04W 4/90; H04W 48/16
(Continued)

(56) References Cited

U.S. PATENT DOCUMENTS

2004/0209622 A1* 10/2004 Kotzin ................. H04W 88/06
                                                     455/414.1
2011/0319073 A1* 12/2011 Ekici .................... H04W 48/18
                                                     455/553.1

FOREIGN PATENT DOCUMENTS

JP     2002-223217 A     8/2002
JP     2005-519504 A     6/2005
(Continued)

OTHER PUBLICATIONS

International Search Report for PCT Application No. PCT/JP2021/011730, mailed on Jun. 8, 2021.
(Continued)

*Primary Examiner* — Huy C Ho
(74) *Attorney, Agent, or Firm* — Sughrue Mion, PLLC

(57)     ABSTRACT

To provide a communication device, a communication system, and a communication method that can easily make contact, the communication device comprises: a receiving unit configured to receive communication information including identification information on a destination user from a first terminal; at least one processor configured to execute an instructions to select, on the basis of the identification information, one among a first network to which a first communication module associated with the user can be connected and a second network to which a second communication module associated with the user can be connected and which is different from the first network; and a unit configured to transmit, via the network selected by the at least one processor, information related to the communication information to the communication module that can be connected to the selected network, among the first communication module and the second communication module.

16 Claims, 9 Drawing Sheets

(58) Field of Classification Search
USPC ......................................................... 455/434
See application file for complete search history.

(56) References Cited

FOREIGN PATENT DOCUMENTS

| | | | |
|---|---|---|---|
| JP | 2008-054145 | A | 3/2008 |
| JP | 2011-259422 | A | 12/2011 |
| JP | 2013-514704 | A | 4/2013 |
| JP | 2014-060715 | A | 4/2014 |
| JP | 2014-116702 | A | 6/2014 |
| JP | 2015-528670 | A | 9/2015 |
| WO | 2012/099504 | A2 | 7/2012 |

OTHER PUBLICATIONS

English translation of Written opinion for PCT Application No. PCT/JP2021/011730, mailed on Jun. 8, 2021.
JP Office Action for JP Application No. 2023-508168, mailed on Jul. 30, 2024 with English Translation.

* cited by examiner

Fig.3

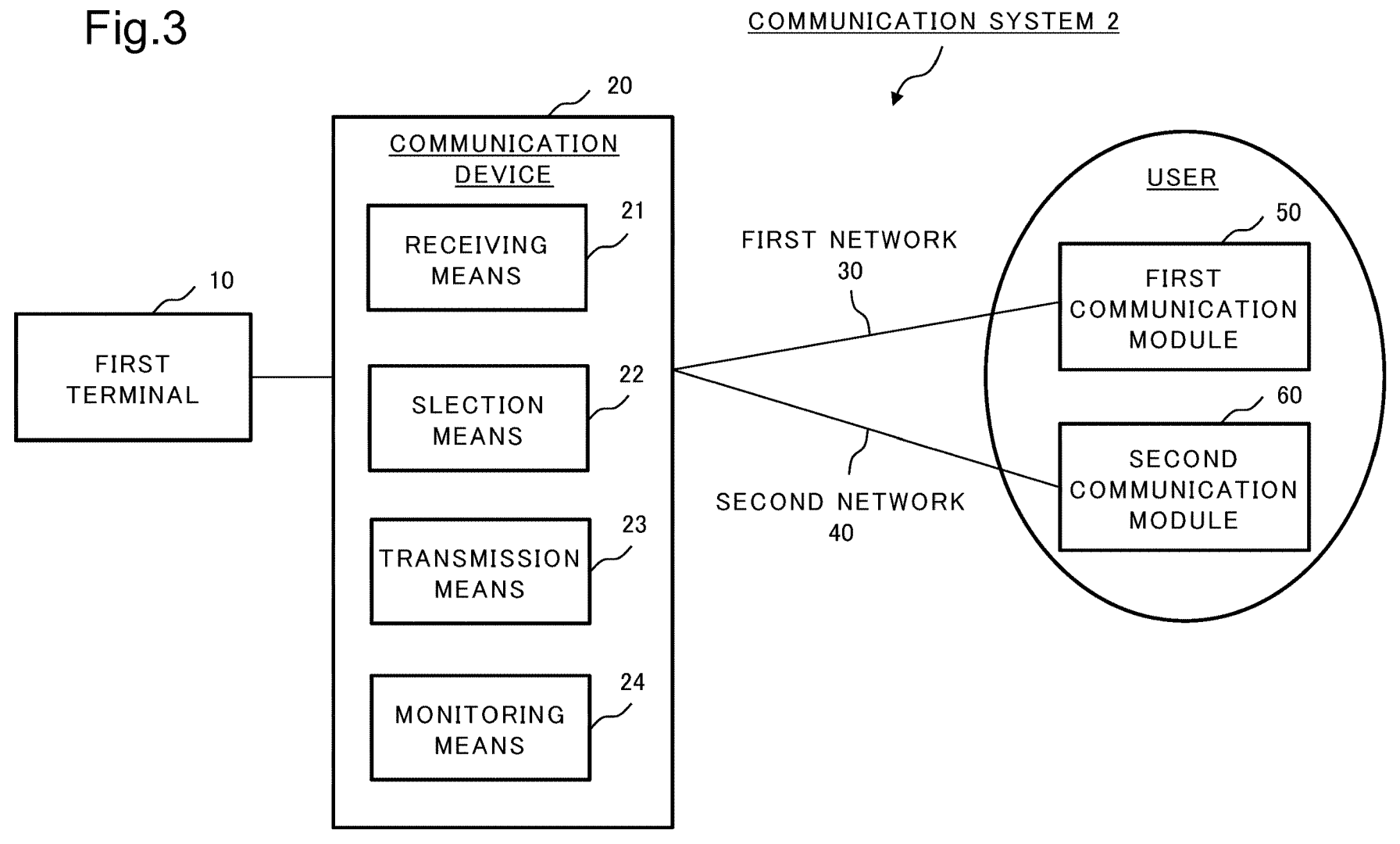

COMMUNICATION SYSTEM 2

USER

FIRST COMMUNICATION MODULE 50

SECOND COMMUNICATION MODULE 60

FIRST NETWORK 30

SECOND NETWORK 40

COMMUNICATION DEVICE 20

RECEIVING MEANS 21

SLECTION MEANS 22

TRANSMISSION MEANS 23

MONITORING MEANS 24

FIRST TERMINAL 10

Fig.5

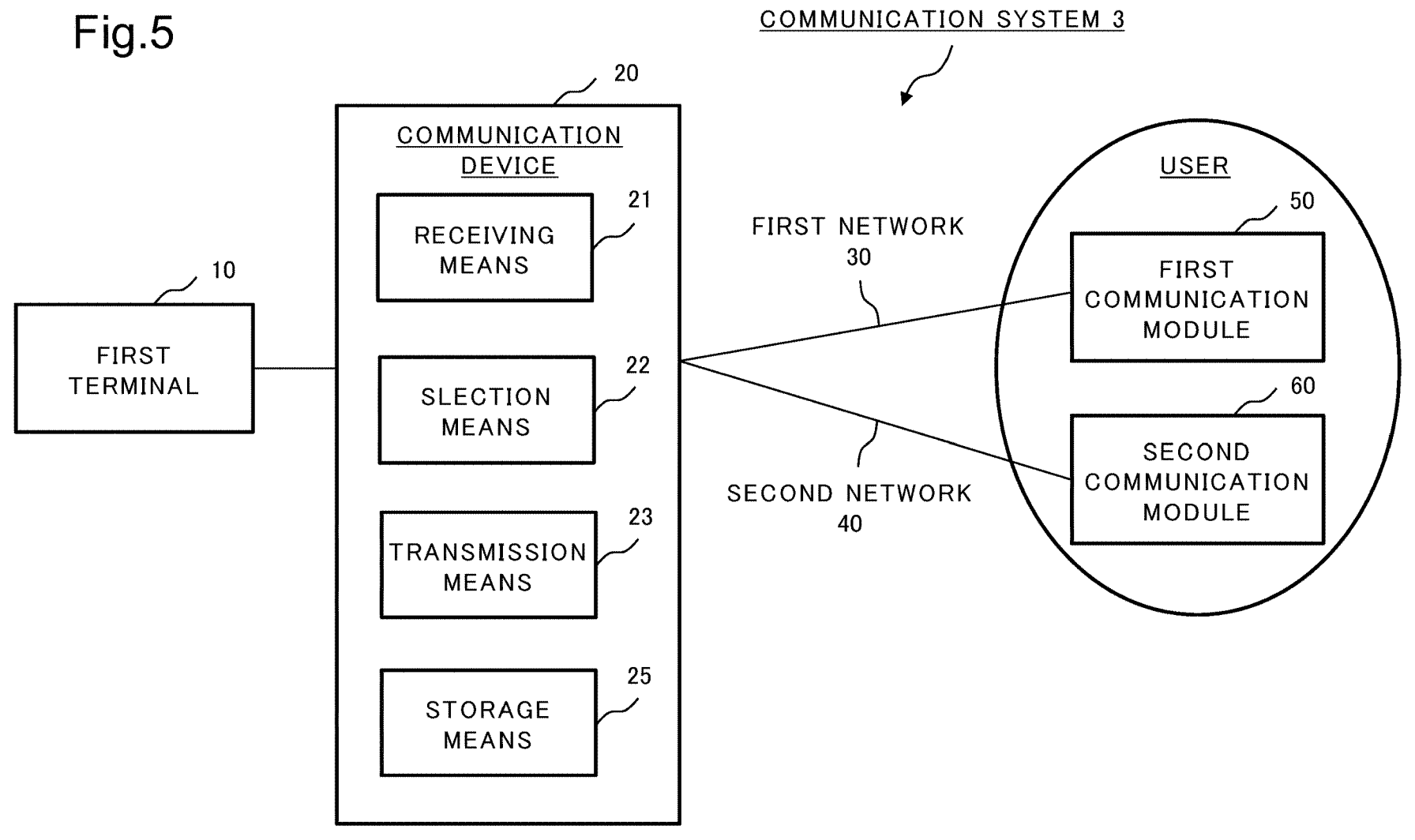

COMMUNICATION SYSTEM 3

USER

FIRST COMMUNICATION MODULE 50

SECOND COMMUNICATION MODULE 60

FIRST NETWORK 30

SECOND NETWORK 40

COMMUNICATION DEVICE 20

RECEIVING MEANS 21

SLECTION MEANS 22

TRANSMISSION MEANS 23

STORAGE MEANS 25

FIRST TERMINAL 10

COMMUNICATION SYSTEM, COMMUNICATION DEVICE, AND COMMUNICATION METHOD

This application is a National Stage Entry of PCT/JP2021/011730 filed on Mar. 22, 2021, the contents of all of which are incorporated herein by reference, in their entirety.

TECHNICAL FIELD

The present disclosure relates to a communication device, a communication system, and a communication method that are capable of easily making contact.

BACKGROUND ART

In an organization such as a police station and a fire department, a dedicated communication line is used for each organization. For example, in the fire department, a communication line based on a digital system of a 260 MHz band is used. It has been studied that, in addition to such a conventional dedicated line, a dedicated long term evolution (LTE) line (referred to as public safety (PS)-LTE) is further added. By using such a line, a network is configured.

PTL 1, for example, discloses a wireless terminal connectable to a plurality of networks. PTL 2 and PTL 3 also disclose a related technique.

CITATION LIST

Patent Literature

PTL 1: Japanese Translation of PCT International Application Publication No. 2013-514704

PTL 2: Japanese Unexamined Patent Application Publication No. 2014-116702

PTL 3: Japanese Unexamined Patent Application Publication No. 2002-223217

SUMMARY OF INVENTION

Technical Problem

In each organization, it is supposed that, while a conventional dedicated line remains, a dedicated LTE line is further used. At that time, a member of each organization uses both of a terminal for the conventional dedicated line and a terminal for the dedicated LTE line. In this case, a person who intends to make contact with the member inputs, to a system, identification information allocated to the member, and the system communicates with both of a destination of the conventional dedicated line and a destination of the LTE line that are associated with the identification information.

In a case as described above, between the two terminals, a terminal to be used for communication cannot be selected, and therefore this matter is complicated for an owner of a terminal.

The present disclosure has been made in view of the above-described problem, and an object of the present disclosure is to provide a communication device, a communication system, and a communication method that are capable of easily making contact.

Solution to Problem

A communication device according to the present disclosure includes:

a receiving means for receiving, from a first terminal, communication information including identification information of a user to be a destination;

a selection means for selecting, based on the identification information, any one of a first network to which a first communication module associated with the user is connectable and a second network to which a second communication module associated with the user is connectable, the second network being different from the first network; and a transmission means for transmitting, via a network selected by the selection means, information related to the communication information to a communication module connectable to the selected network among the first communication module and the second communication module.

Further, a communication system according to the present disclosure includes:

the above-described communication device;

the first terminal;

the first network;

the second network;

a second terminal including the first communication module owned by the user; and a third terminal including the second communication module owned by the user.

Further, a communication method according to the present disclosure includes:

receiving, from a first terminal, communication information including identification information of a user to be a destination;

selecting, based on the identification information, any one of a first network to which a first communication module associated with the user is connectable and a second network to which a second communication module associated with the user is connectable, the second network being different from the first network; and transmitting, via the selected network, information related to the communication information to a communication module connectable to the selected network among the first communication module and the second communication module.

Advantageous Effects of Invention

According to the present disclosure, it is possible to provide a communication device, a communication system, and a communication method that are capable of easily making contact.

BRIEF DESCRIPTION OF DRAWINGS

FIG. 3 is a diagram illustrating a configuration example of a communication system according to a second example embodiment of the present disclosure.

FIG. 5 is a diagram illustrating a configuration example of a communication system according to a third example embodiment of the present disclosure.

EXAMPLE EMBODIMENT

First Example Embodiment

Figure 1:
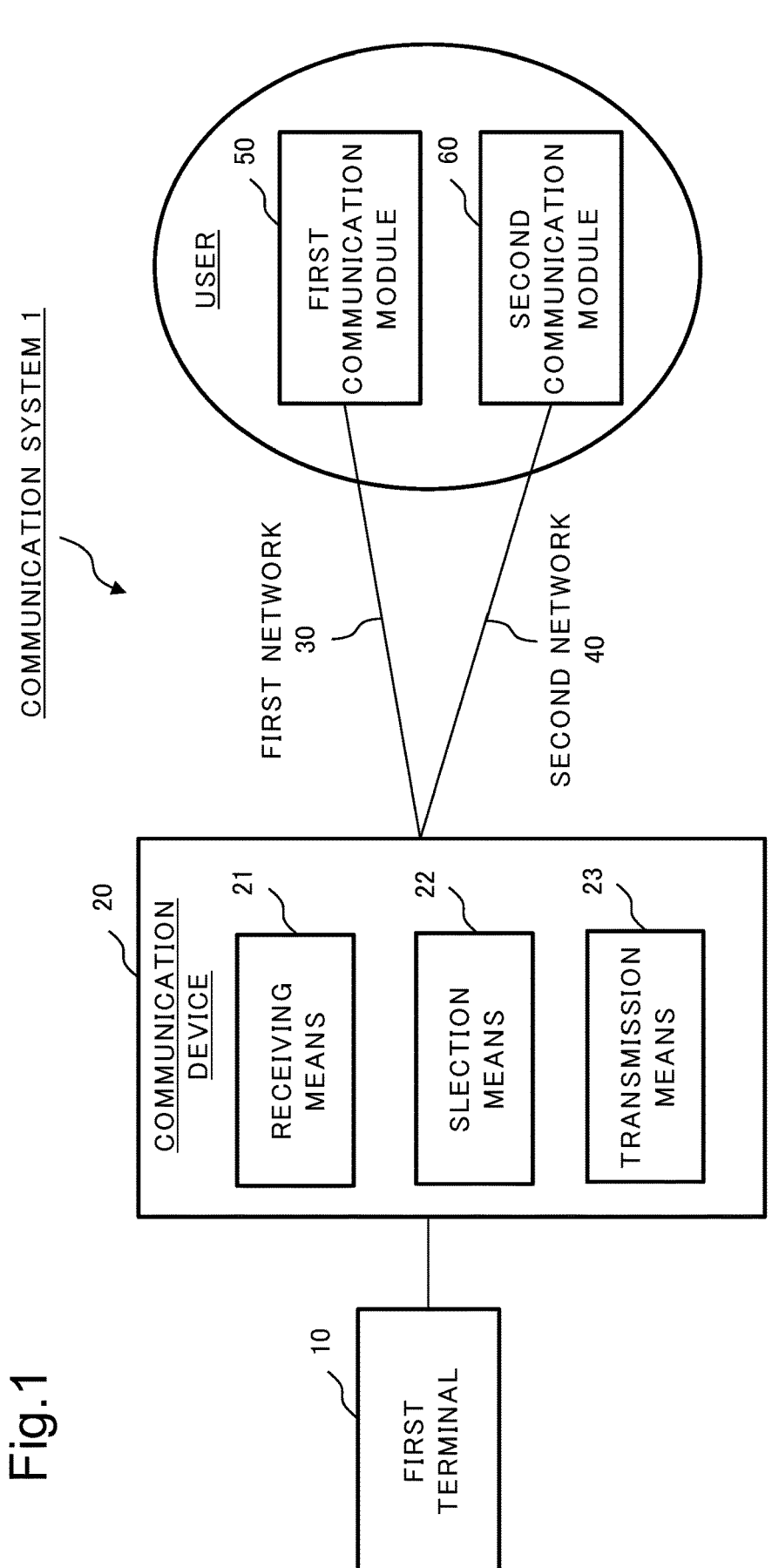
FIG. 1 is a block diagram illustrating a configuration example of a communication system according to a first example embodiment of the present disclosure.
Figure 2:
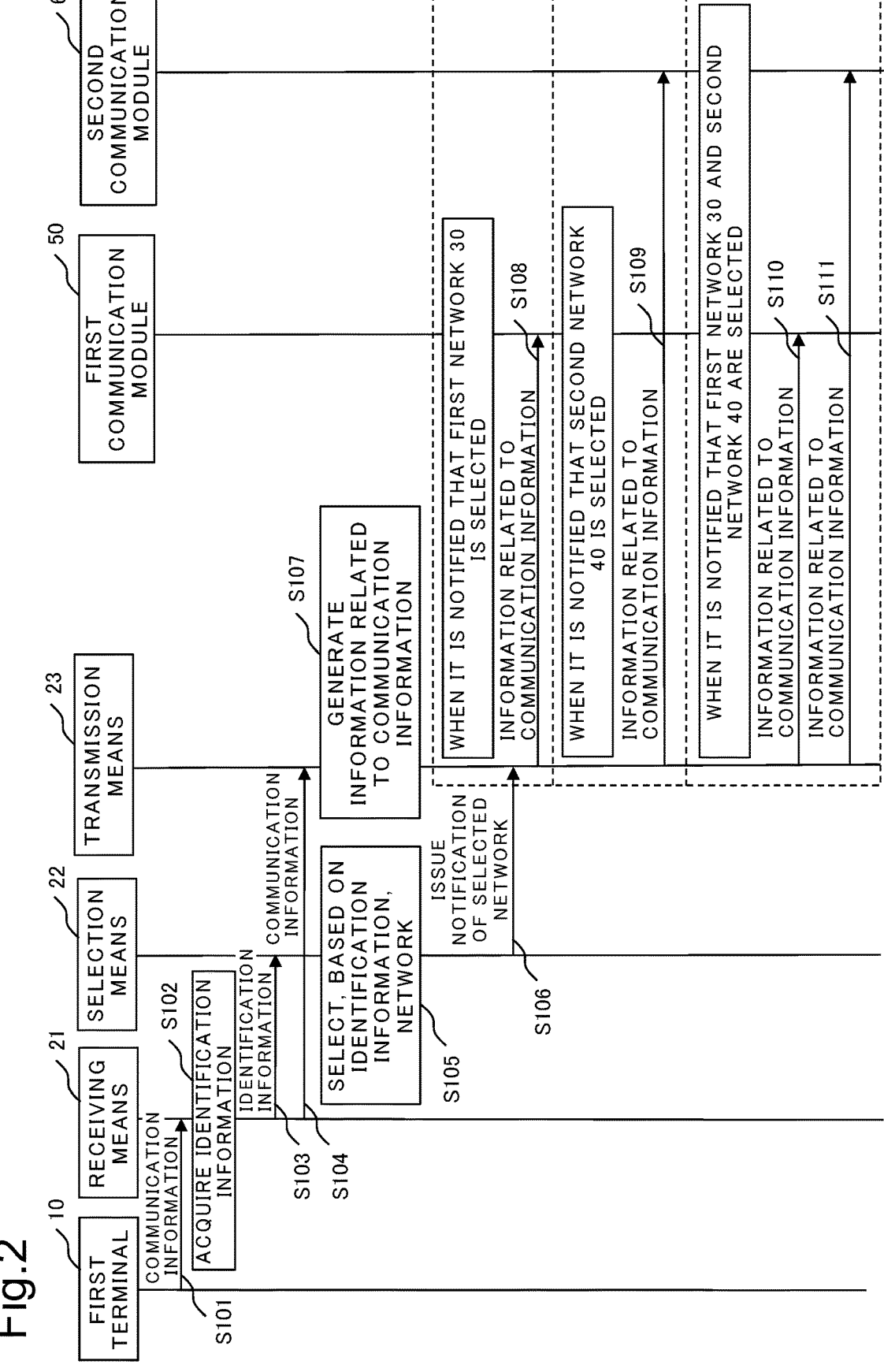
FIG. 2 is a sequence diagram illustrating an operation example of the communication system according to the first example embodiment of the present disclosure.

A communication system 1 according to a first example embodiment is described based on FIG. 1 and FIG. 2. FIG. 1 is a block diagram illustrating a configuration example of the communication system 1. FIG. 2 is a sequence diagram illustrating an operation example of the communication system 1.

As illustrated in FIG. 1, the communication system 1 includes a first terminal 10, a communication device 20, a first network 30, a second network 40, a first communication module 50, and a second communication module 60.

The first terminal 10 transmits, to the communication device 20, communication information including identification information of a user to be a destination. The communication information may be, for example, a request for a phone call with a user to be a destination, voice data to the user, a notification for participation in chat, or video data. The first terminal 10 is a terminal including a communication function and may be, for example, a radio, a smartphone, a personal computer (PC), or a server.

The communication device 20 includes a receiving means 21, a selection means 22, and a transmission means 23. The communication device 20 may be, for example, a smartphone, a PC, or a server.

The receiving means 21 receives, from the first terminal 10, communication information including identification information of a user to be a destination. The receiving means 21 notifies the selection means 22 of identification information included in communication information. The receiving means 21 outputs communication information to the transmission means 23.

The selection means 22 selects, based on identification information, at least one of a first network 30 to which the first communication module 50 associated with a user is connectable and a second network 40 to which the second communication module 60 associated with the user is connectable. The selection means 22 stores, for example, an association relation between one of the first network 30 and the second network 40 and identification information. In this case, the selection means 22 refers to the association relation and selects a network associated with the identification information. The selection means 22 may not necessarily store but may acquire, from an external server, an association relation between one of the first network 30 and the second network 40 and identification information. A user to be a destination may previously set which one of the first network 30 and the second network 40 is associated with own identification information.

The first network 30 and the second network 40 are networks different from each other. For example, the first network 30 is an LTE line, and the second network 40 is a communication line based on a digital system of a 260 MHz band. The first network 30 and the second network 40 may be operated by business operators different from each other.

The selection means 22 previously stores a first priority set for the first network 30 and a second priority set for the second network 40. In this case, the selection means 22 compares the first priority with the second priority and may select, among the first network 30 and the second network 40, a network having higher propriety.

The first priority and the second priority are set based on at least one of a type of a user to be a destination and a type of communication information. The type of a user is, for example, an official position of a user in an organization. In this case, as the official position of the user is higher, the first priority is set to be at an upper level and the second priority is set to be at a lower level. Thereby, the selection means 22 can select, for a user of an upper official position, an LTE line with higher speed than a communication line based on a digital system of a 260 MHz band. The type of communication information is at least one of a degree of importance and a degree of urgency of communication information. In this case, as a degree of importance or a degree of urgency is higher, the first priority is set to be higher and the second priority is set to be lower. Thereby, the selection means 22 can select, for communication information having a high degree of importance or a high degree of urgency, an LTE line with higher speed than a communication line based on a digital system of a 260 MHz band. It is assumed that a degree of importance or a degree of urgency of communication information is included in communication information from the first terminal 10.

The transmission means 23 transmits, via a network selected by the selection means 22, information related to communication information to a communication module connectable to a selected network among the first communication module 50 and the second communication module 60. The transmission means 23 transmits, when the first network 30 is selected by the selection means 22, information related to communication information to the first communication module 50. The transmission means 23 transmits, when the second network 40 is selected by the selection means 22, information related to communication information to the second communication module 60.

The information related to communication information is, for example, information including at least communication information transmitted from the first terminal 10 or information indicating that communication information is transmitted from the first terminal 10 to a user. Herein, the information related to communication information is generated, for example, in such a way that the transmission means 23 extracts data included in communication information received by the receiving means 21 and the data are provided with an address of the first communication module 50 or the second communication module 60.

When, for example, communication information received by the receiving means 21 from the first terminal 10 includes text data, voice data, or video data, the transmission means 23 transmits, to the first communication module 50 or the second communication module 60, information related to communication information including these pieces of data. When communication information received by the receiving means 21 from the first terminal 10 includes a request for a phone call with a user, a notification for participation in chat, voice data, or vide data, the transmission means 23 may transmit, instead of these pieces of data, as information related to communication information, a connection establishment request from the first terminal 10 to the first communication module 50 or the second communication module 60. When the first communication module 50 or the second communication module 60 responds to the connection establishment request, the first terminal 10 performs a phone call with a user, performs communication based on chat, or transmits voice data and video data via the connection without the communication device 20.

The first communication module 50 is allocated with an address (e.g., an Internet protocol (IP) address or an individual number) in the first network 30. The second communication module 60 is allocated with an address (e.g., an IP address or an individual number) in the second network 40. The first communication module 50 and the second communication module 60 may be provided for separate communication terminals different from each other or may be provided for the same terminal.

An operation of the communication system 1 is described based on FIG. 2. The first terminal 10 transmits, to the receiving means 21, communication information (S101). The receiving means 21 acquires, from the received communication information, identification information of a user (S102). The receiving means 21 outputs, to the selection means 22, the identification information included in the received communication information (S103). The receiving means 21 outputs, to the transmission means 23, the received communication information (S104).

The selection means 22 selects, based on the identification information, the first network 30 to which the first communication module 50 is connectable or the second network 40 to which the second communication module 60 is connectable (S105). At that time, the selection means 22 selects at least one of the first network 30 and the second network 40 associated with the identification information. The selection means 22 notifies the transmission means 23 of the selected network (S106).

The transmission means 23 generates, based on the communication information acquired from the receiving means 21, information related to communication information (S107). The transmission means 23 transmits the information related to communication information to a communication module connectable to the network selected by the selection means 22. Specifically, the transmission means 23 transmits, when it is notified, from the selection means 22, that the first network 30 is selected, via the first network 30, the information related to communication information to the first communication module 50 (S108). The transmission means 23 transmits, when it is notified, from the selection means 22, that the second network 40 is selected, via the second network 40, the information related to communication information to the second communication module 60 (S109). The transmission means 23 transmits, when it is notified, from the selection means 22, that the first network 30 and the second network 40 are selected, via the first network 30, the information related to communication information to the first communication module 50 (S110). In this case, the transmission means 23 further transmits, via the second network 40, the information related to communication information to the second communication module 60 (S111).

As described above, the communication device 20 includes the receiving means 21, the selection means 22, and the transmission means 23. The receiving means 21 receives, from a first terminal, communication information including identification information of a user to be a destination. The selection means 22 selects, based on the identification information, any one of the first network 30 to which the first communication module 50 associated with the user is connectable and the second network 40 to which the second communication module 60 associated with the user is connectable, the second network 40 being different from the first network 30. The transmission means 23 transmits, via a network selected by the selection means 22, information related to communication information to a communication module connectable to the network selected by the selection means 22 among the first communication module 50 and the second communication module 60.

As described above, the communication device 20 selects at least one network selected by the selection means 22 among the first network 30 and the second network 40 and transmits, via a communication module connectable to the selected network, information related to communication information. Therefore, even when a user owns a plurality of communication modules connectable to different networks, at least one network is selected, and thereby information related to communication information can be transmitted. In this case, information related to communication information is received by a selected communication module among a plurality of communication modules owned by a user, and therefore the user can easily acquire the information related to communication information. In this manner, according to the communication device 20, contact can be easily made with a user.

Second Example Embodiment

Figure 4:
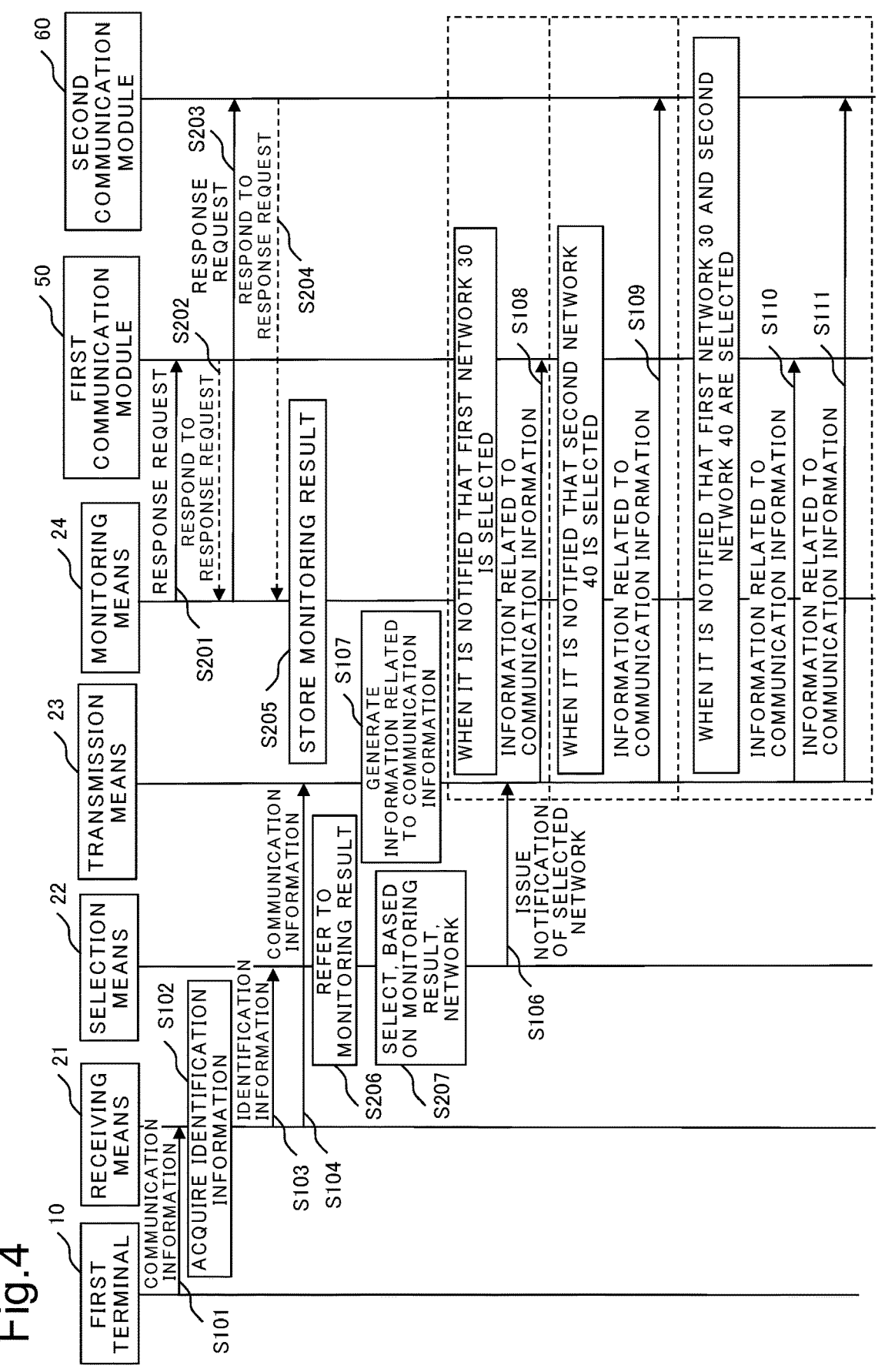
FIG. 4 is a sequence diagram illustrating an operation example of the communication system according to the second example embodiment of the present disclosure.

A communication system 2 according to a second example embodiment is described based on FIG. 3 and FIG. 4. FIG. 3 is a block diagram illustrating a configuration example of the communication system 2. FIG. 4 is a sequence diagram illustrating an operation example of the communication system 2. The communication system 2 includes a communication device 20, a first network 30, a second network 40, a first communication module 50, and a second communication module 60. The communication system 2 is different from the communication system 1 in that the communication device 20 further includes a monitoring means 24.

The monitoring means 24 monitors both of a connection state between the first network 30 and the first communication module 50 and a connection state between the second network 40 and the second communication module 60. Specifically, the monitoring means 24 monitors, whether the first communication module 50 is communicable with the communication device 20 via the first network 30. The monitoring means 24 transmits, via the first network 30, for example, a response request to the first communication module 50. In this case, the monitoring means 24 monitors whether the first communication module 50 is communicable with the communication device 20, according to whether a response from the first communication module 50 is received within a predetermined period. Further, the monitoring means 24 monitors whether the second communication module 60 is communicable with the communication device 20 via the second network 40. The monitoring means 24 transmits, via the second network 40, for example, a response request to the second communication module 60. In this case, the monitoring means 24 monitors whether the second communication module 60 is communicable with the communication device 20, according to whether a response from the second communication module 60 is received within a predetermined period. The monitoring means 24 may cause the transmission means 23 to transmit a response request or may cause the receiving means 21 to receive a response to the response request. The monitoring means 24 stores, as a monitoring result, whether each communication module is connectable to a network.

In the communication system 2, the selection means 22 refers to a monitoring result based on the monitoring means 24 and selects, based on the monitoring result, the first network 30 or the second network 40. When, for example, the monitoring means 24 determines that the first communication module 50 is in a state of being connectable to the first network 30 and the second communication module 60 is in a connection-disabled state with respect to the second network 40, the selection means 22 selects the first network 30. The reference herein may be a matter that the selection means 22 accesses the monitoring means 24 and acquires data indicating a monitoring result or may be a matter that from the monitoring means 24, data indicating a monitoring result is output to the selection means 22.

When the monitoring means 24 determines that the first communication module 50 is in a connection-disabled state with respect to the first network 30 and the second communication module 60 is in a state of being connectable to the second network 40, the selection means 22 selects the second network 40.

When the monitoring means 24 determines that the first communication module 50 is in a state of being connectable to the first network 30 and the second communication module 60 is in a state of being connectable to the second network, the selection means 22 selects, similarly to the communication system 1, based on identification information or a first priority set for the first network 30 and a second priority set for the second network 40, the first network 30 or the second network 40.

An operation of the communication system 2 is described based on FIG. 4. Processing of S101 to S104 and S106 to S111 illustrated in FIG. 4 is similar to processing of S101 to S104 and S106 to S111 illustrated in FIG. 2, and therefore description thereof is omitted.

In the communication system 2, the monitoring means 24 transmits a response request to the first communication module 50 (S201). The first communication module 50 responds to the received response request (S202). The monitoring means 24 transmits a response request to the second communication module 60 (S203). The second communication module 60 responds to the received response request (S204).

The monitoring means 24 stores a monitoring result (S205). Specifically, the monitoring means 24 stores, when a response from the first communication module 50 is made, a matter that the first communication module 50 is connectable to the first network 30. The monitoring means 24 stores, when a response from the first communication module 50 is not made within a predetermined period, a matter that the first communication module 50 cannot be connected to the first network 30. The monitoring means 24 stores, when a response from the second communication module 60 is made, a matter that the second communication module 60 is connectable to the second network 40. The monitoring means 24 stores, when a response from the second communication module 60 is not made within a predetermined period, a matter that the second communication module 60 cannot be connected to the second network 40.

The selection means 22 refers to a monitoring result stored by the monitoring means 24 (S206). Specifically, the selection means 22 refers to a matter whether the first communication module 50 and the second communication module 60 are connectable or cannot be connected. The selection means 22 selects, based on a monitoring result of the monitoring means 24, the first network 30 or the second network 40 (S207). Specifically, the selection means 22 selects the first network 30, as described above, when the monitoring means 24 determines that only the first network 30 is connected to the first communication module 50. The selection means 22 selects the second network 40, as described above, when the monitoring means 24 determines that only the second network 40 is connected to the second communication module 60. The selection means 22 selects the first network 30 or the second network 40, similarly to the communication system 1, based on identification information or a first propriety and a second priority, when the monitoring means 24 determines that the first network 30 and the second network 40 are connected to the first communication module 50 and the second communication module 60 each.

As described above, the communication device 20 in the communication system 2 includes the monitoring means 24 for monitoring both of a connection state between the first network 30 and the first communication module 50 and a connection state between the second network 40 and the second communication module 60. The selection means 22 selects, based on a monitoring result of the monitoring means 24, the first network 30 or the second network 40. Thereby, the communication device 20 can transmit, by using a network communicable with a communication module among a plurality of networks, information related to communication information. As a result, according to the communication system 2, contact can be made with a user more certainly.

The communication device 20 in the communication system 2 includes, similarly to the communication device 20 in the communication system 1, the receiving means 21, the selection means 22, and the transmission means 23 and therefore, is capable of easily making contact with a user.

Third Example Embodiment

Figure 6:
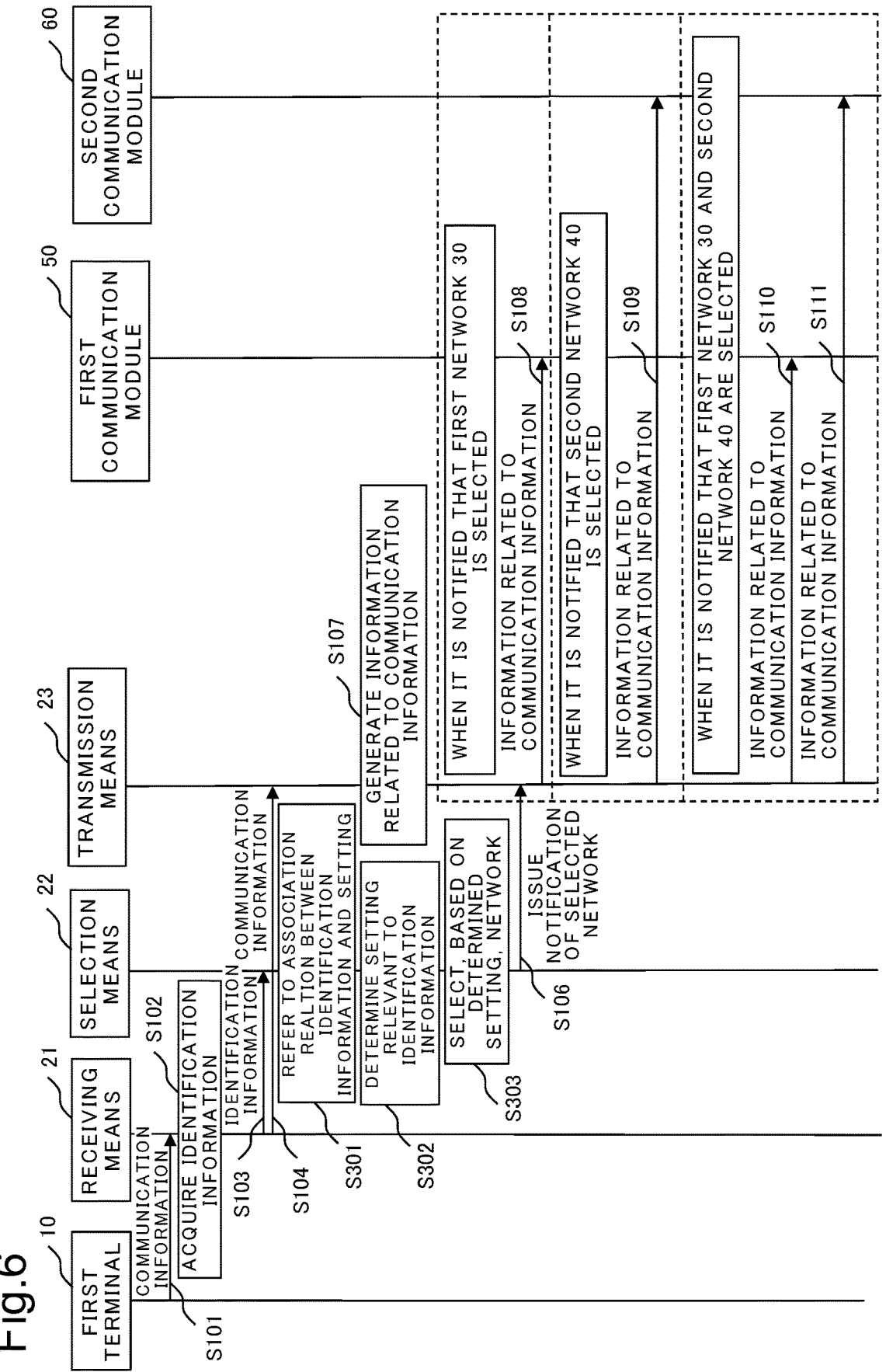
FIG. 6 is a sequence diagram illustrating an operation example of the communication system according to the third example embodiment of the present disclosure.

A communication system 3 according to a third example embodiment is described based on FIG. 5 and FIG. 6. FIG. 5 is a block diagram illustrating a configuration example of the communication system 3. FIG. 6 is a sequence diagram illustrating an operation example of the communication system 3. The communication system 3 includes a communication device 20, a first network 30, a second network 40, a first communication module 50, and a second communication module 60. The communication system 3 is different from the communication system 1 in that the communication device 20 further includes a storage means 25.

The storage means 25 stores an association relation in which any one of first setting for issuing a notification to one of networks and second setting for issuing a notification to both networks is associated with identification information of a user. The selection means 22 refers to the association relation and determines setting relevant to identification information of a user included in communication information received by the receiving means 21. The reference herein may be a matter that the selection means 22 accesses the storage means 25 and acquires data indicating an association relation or may be a matter that from the storage means 25, data indicating an association relation is output to the selection means 22. The selection means 22 selects, when determining first setting, only one of the first network 30 and the second network 40. The selection means 22 selects, when determining second setting, both of the first network 30 and the second network 40.

By using FIG. 6, an operation of the communication system 3 is described. Processing of S101 to S104 and S106 to 110 in the communication system 3 is similar to S101 to S104 and S106 to 110 of the communication system 1, and therefore description thereof is omitted.

In the communication system 3, the selection means 22 refers to an association relation in which any one of first setting and second setting stored in the storage means 24 is associated with identification information of a user (S301). The selection means 22 determines setting relevant to the identification information (S302). The selection means 22 selects, based on the determined setting, the first network 30 to which the first communication module 50 is connectable or the second network 40 to which the second communication module 60 is connectable (S303). Specifically, the selection means 22 selects, when determining that the first setting is set for the user, only the first network 30 or the second network 40, based on the identification information similarly to processing of S104. The selection means 22 selects, when determining the second setting, both of the first network 30 and the second network 40.

As described above, in the communication system 3, when first setting is associated with a user, only any one of the first network 30 and the second network 40 is selected, and when second setting is associated with the user, both of the first network 30 and the second network 40 are selected.

Thereby, when any one of first setting and second setting is set for a user, a matter that information related to communication information is transmitted to one of the first communication module 50 and the second communication module 60 and a matter that information related to communication information is transmitted to both of the first communication module 50 and the second communication module 60 can be switched. Thereby, while reception based on one module is a general rule and simple contact can be made, a flexible response can be made to even a special user having a hope for reception based on a plurality of modules.

The communication device 20 in the communication system 3 includes, similarly to the communication device 20 in the communication system 1, the receiving means 21, the selection means 22, and the transmission means 23 and therefore, can easily make contact with a user.

Figure 7:
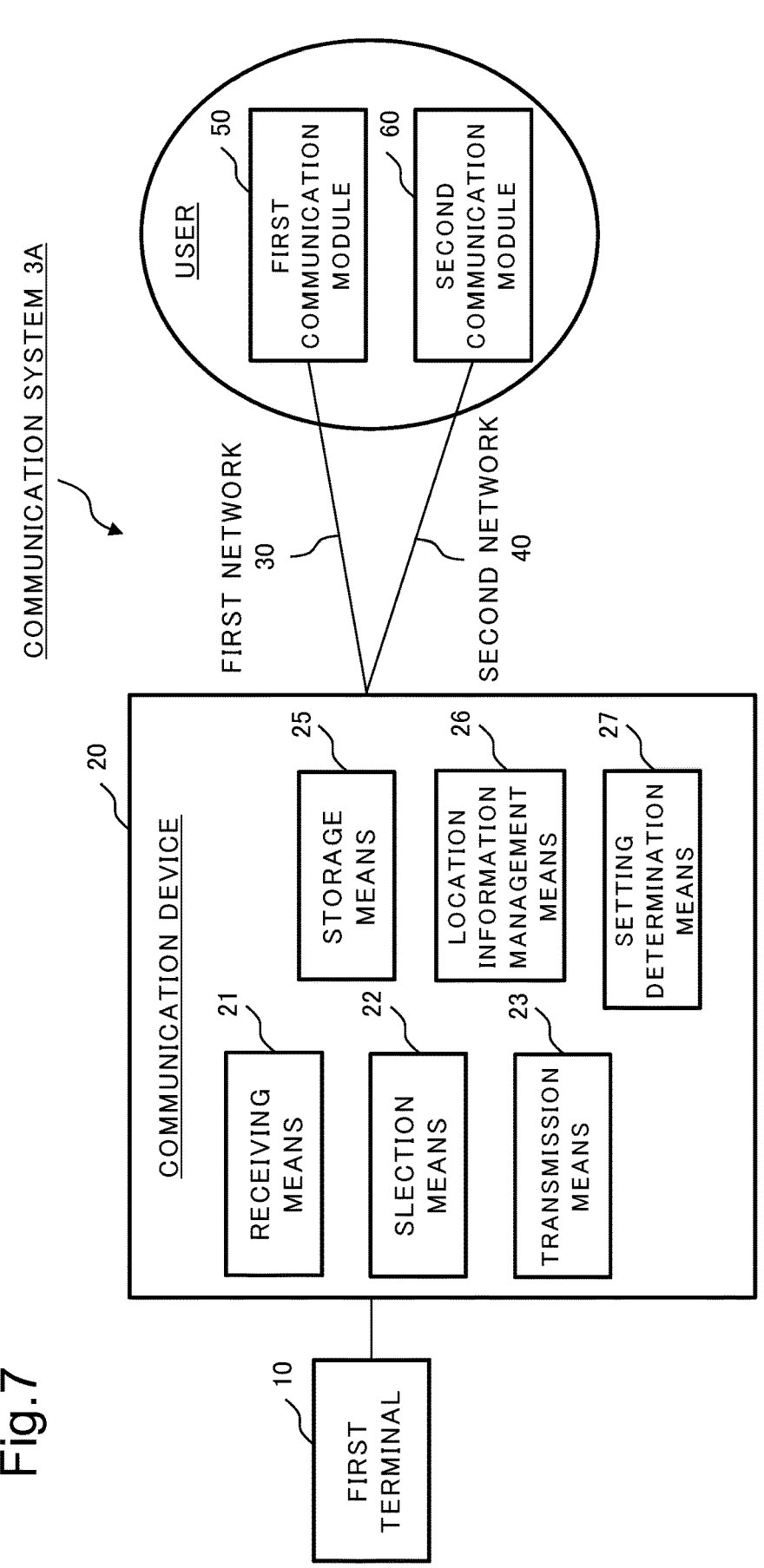
FIG. 7 is a block diagram illustrating a configuration of a modified example of the communication system according to the third example embodiment of the present disclosure.

Next, a communication system 3A being a modified example of the communication system 3 is described. FIG. 7 illustrates a configuration of the communication system 3A. The communication system 3A includes, similarly to the communication system 3, a first network 30, a second network 40, a first communication module 50, and a second communication module 60. The communication system 3A is different from the communication system 3 in that a communication device 20 further includes a location information management means 26 and a setting determination means 27.

The location information management means 26 manages first location information indicating a location of the first communication module 50 and second location information indicating a location of the second communication module 60. Specifically, the first communication module 50 and the second communication module 60 each include a positioning means such as a global navigation satellite system (GNSS) and a global positioning system (GPS) capable acquiring own location information. Both of the first communication module 50 and the second communication module 60 communicate with the communication device 20 and thereby, notify the location information management means 26 of first location information and second location information.

The setting determination means 27 determines, based on the first location information and the second location information, a distance between the first communication module 50 and the second communication module 60 and determines, according to the distance between the first communication module 50 and the second communication module 60, whether first setting is applied or second setting is applied to a user.

When, for example, the distance between the first communication module 50 and the second communication module 60 is short, it is supposed that a user owns both of the first communication module 50 and the second communication module 60. Therefore, in order to avoid a cumbersome operation by the user, communication information is preferably transmitted to only one of the first communication module 50 and the second communication module 60. Therefore, the setting determination means 27 sets, when a distance between the first communication module 50 and the second communication module 60 is shorter than a threshold, first setting is set for the user of the first communication module 50 and the second communication module 60.

When a distance between the first communication module 50 and the second communication module 60 is long, it is supposed that a user does not own either the first communication module 50 or the second communication module 60. Therefore, in order to certainly make contact with the user, information related to communication information is preferably transmitted both of the first communication module 50 and the second communication module 60. Therefore, the setting determination means 27 sets, when a distance between the first communication module 50 and the second communication module 60 is longer than a threshold, second setting is set for the user of the first communication module 50 and the second communication module 60. According to the configuration, in the communication system 3A, while reception based on one module is a general rule and simple contact can be made, a flexible response can be made even in a special situation where it is determined that reception based on a plurality of modules is desirable.

Fourth Example Embodiment

Figure 8:
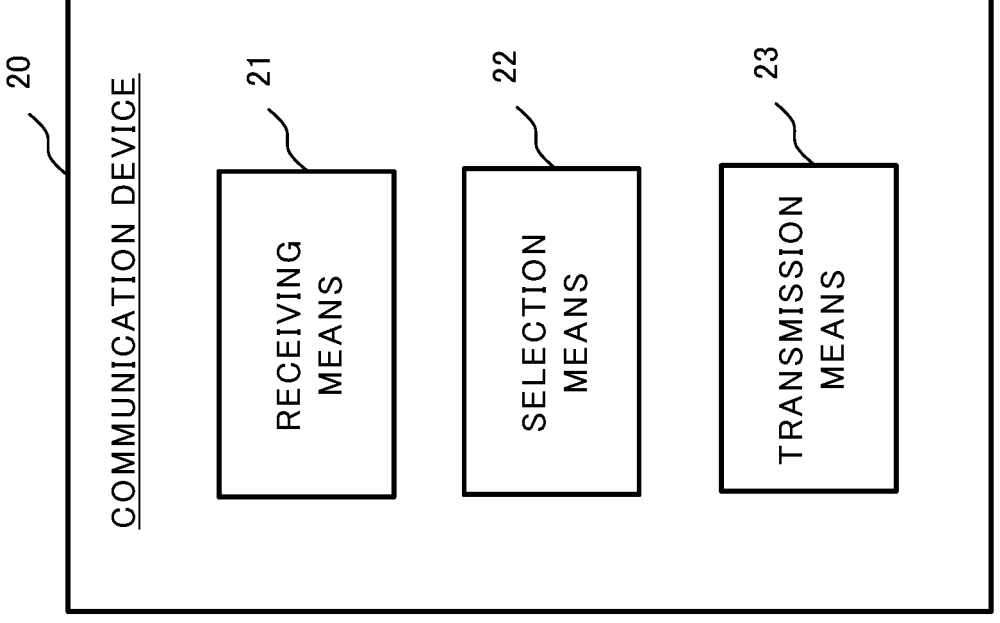
FIG. 8 is a block diagram illustrating a configuration example of a communication device according to a fourth example embodiment of the present disclosure.
Figure 9:
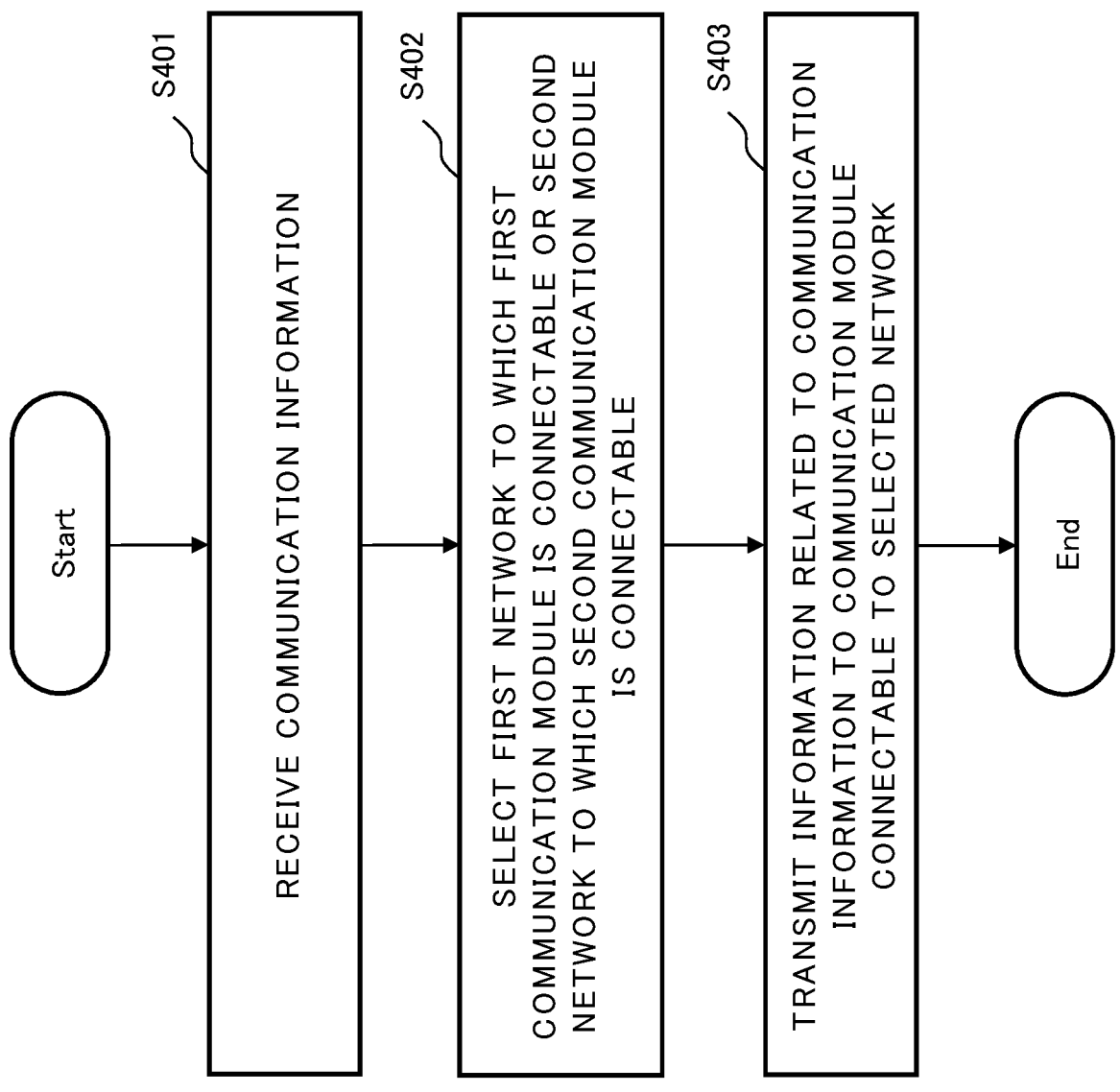
FIG. 9 is a flowchart illustrating an operation example of the communication device according to the fourth example embodiment of the present disclosure.

A communication device 20 according to a fourth example embodiment is described based on FIG. 8 and FIG. 9. The communication device 20 includes, as illustrated in FIG. 8, a receiving means 21, a selection means 22, and a transmission means 23. The communication device 20 may further include a component, a function, and a connection relation similar to the communication device 20 in the above-described communication systems 1, 2, 3, and 3A.

The receiving means 21 receives, from a first terminal, not illustrated, communication information including identification information of a user to be a destination. The receiving means 21 may include a function and a connection relation similar to the receiving means 21 in the above-described communication systems 1, 2, 3, and 3A.

The selection means 22 selects, based on identification information, any one of a first network to which a first communication module associated with a user is connectable and a second network to which a second communication module associated with the user is connectable, the second network being different from the first network. The selection means 22 may include a function and a connection relation similar to the selection means 22 in the above-described communication systems 1, 2, 3, and 3A.

The transmission means 23 transmits, via a network selected by the selection means 22, information related to communication information to a communication module connectable to the selected network among the first communication module and the second communication module. The transmission means 23 may include a function and a connection relation similar to the transmission means 23 in the above-described communication systems 1, 2, 3, and 3A.

Next, an operation of the communication device 20 is described based on FIG. 9.

The receiving means 21 receives communication information (S401). The selection means 22 selects a first network to which a first communication module is connectable or a second network to which a second communication module is connectable (S402). The transmission means 23 transmits, to a communication module connectable to the selected network, information related to communication information (S403).

As described above, the communication device 20 includes the receiving means 21, the selection means 22, and the transmission means 23. The receiving means 21 receives, from a first terminal, communication information including identification information of a user to be a destination. The selection means 22 selects, based on the identification information, any one of a first network to which a first communication module associated with the user is connectable and a second network to which a second communication module associated with the user is connectable, the second network being different from the first network. The transmission means 23 transmits, via the network selected by the selection means 22, information related to the communication information to a communication module connectable to the selected network among the first communication module and the second communication module.

As described above, the communication device 20 selects one network selected by the selectin means 22 among a first network and a second network and transmits, via a communication module connectable to the selected network, information related to communication information. Therefore, even when a user owns a plurality of communication modules connectable to different networks, at least one network is selected, and thereby information related to communication information can be transmitted. In this case, information related to communication information is received by a selected communication module among a plurality of communication modules owned by a user, and therefore the user can easily recognize the information related to communication information. In this manner, according to the communication device 20, contact can be easily made with a user. Moreover, the communication device 20 can flexibly respond to a special situation where it is determined that reception based on a plurality of modules is desirable while reception based on one module is a general rule and simple contact can be made.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1, 2, 3, 3A Communication system
10 First terminal

20 Communication device
21 Receiving means
22 Selection means
23 Transmission means
24 Monitoring means
25 Storage means
26 Location information management means
27 Setting determination means
30 First network
40 Second network
50 First communication module
60 Second communication module

What is claimed is:

1. A communication device comprising:
a receiving unit configured to receive, from a first terminal, communication information including identification information of a user to be a destination;
at least one memory configured to store instructions;
at least one processor configured to execute the instructions to;
compare a first priority set for a first network to which a first communication module associated with the user is connectable with a second priority set for a second network to which a second communication module associated with the user is connectable, the second network being different from the first network;
select, based on the identification information, a network having a higher priority among the first network and the second network, the first priority and the second priority being set according to a type of the user; and
a transmission unit configured to transmit, via the selected network, information related to the communication information to a communication module connectable to the selected network among the first communication module and the second communication module.

2. The communication device according to claim 1, wherein
the first priority and the second priority are set according to a type of the user and a type of the communication information.

3. The communication device according to claim 2, further comprising:
a storage unit configured to store any one of first setting and second setting in association with the user, wherein
the at least one processor
selects, when the first setting is associated with the user, only one of the first network and the second network, and
selects, when the second setting is associated with the user, both of the first network and the second network.

4. The communication device according to claim 3, wherein the at least one processor
manages first location information indicating a location of the first communication module and second location information indicating a location of the second communication module; and
acquires, based on the first location information and the second location information, a distance between the first communication module and the second communication module, and
determines, according to the distance, whether the first setting is applied or the second setting is applied to the user.

5. A communication system comprising:

the communication device according to claim 2;

the first terminal;

the first network;

the second network;

a second terminal including the first communication module owned by the user; and a third terminal including the second communication module owned by the user.

6. The communication device according to claim 2, wherein the type of the communication information is a degree of importance or a degree of urgency.

7. The communication device according to claim 1, wherein the at least one processor monitors both of a connection state between the first network and the first communication module and a connection state between the second network and the second communication module, selects the first network when the first communication module is in a state of being connected to the first network and the second communication module is in a state of being not connected to the second network, and selects the second network when the first communication module is in a state of being not connected to the first network and the second communication module is in a state of being connected to the second network.

8. The communication device according to claim 7, further comprising:

a storage unit configured to store any one of first setting and second setting in association with the user, wherein the at least one processor selects, when the first setting is associated with the user, only one of the first network and the second network, and selects, when the second setting is associated with the user, both of the first network and the second network.

9. The communication device according to claim 8, wherein the at least one processor manages first location information indicating a location of the first communication module and second location information indicating a location of the second communication module; and acquires, based on the first location information and the second location information, a distance between the first communication module and the second communication module, and determines, according to the distance, whether the first setting is applied or the second setting is applied to the user.

10. A communication system comprising:

the communication device according to claim 7;

the first terminal;

the first network;

the second network;

a second terminal including the first communication module owned by the user; and a third terminal including the second communication module owned by the user.

11. The communication device according to claim 1, further comprising a storage unit configured to store any one of first setting and second setting in association with the user, wherein the at least one processor selects, when the first setting is associated with the user, only one of the first network and the second network, and selects, when the second setting is associated with the user, both of the first network and the second network.

12. The communication device according to claim 11, wherein the at least one processor manages first location information indicating a location of the first communication module and second location information indicating a location of the second communication module; and acquires, based on the first location information and the second location information, a distance between the first communication module and the second communication module, and determines, according to the distance, whether the first setting is applied or the second setting is applied to the user.

13. A communication system comprising:

the communication device according to claim 1;

the first terminal;

the first network;

the second network;

a second terminal including the first communication module owned by the user; and a third terminal including the second communication module owned by the user.

14. The communication device according to claim 1, wherein the type of the user is an official position of the user in an organization.

15. A communication method comprising:

receiving, from a first terminal, communication information including identification information of a user to be a destination;

comparing a first priority set for a first network to which a first communication module associated with the user is connectable with a second priority set for a second network to which a second communication module associated with the user is connectable, the second network being different from the first network;

selecting, based on the identification information, a network having a higher priority among the first network and the second network, the first priority and the second priority being set according to a type of the user; and transmitting, via the selected network, information related to the communication information to a communication module connectable to the selected network among the first communication module and the second communication module.

16. The communication device according to claim 2, wherein the at least one processor monitors both of a connection state between the first network and the first communication module and a connection state between the second network and the second communication module, selects the first network when the first communication module is in a state of being connected to the first network and the second communication module is in a state of being not connected to the second network, and selects the second network when the first communication module is in a state of being not connected to the first network and the second communication module is in a state of being connected to the second network.

* * * * *